Dec. 24, 1957    J. N. AMIGONE    2,817,459
WINE BOTTLE COOLER, ICE BUCKET AND BEVERAGE
DISPENSER, AND HOLDER THEREFOR
Filed Aug. 15, 1955    2 Sheets-Sheet 2
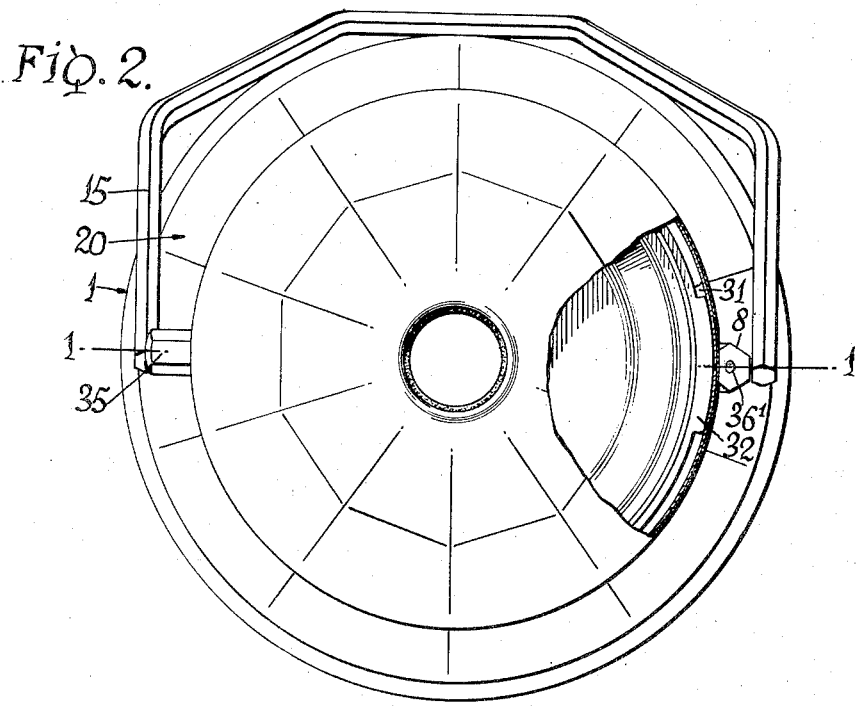
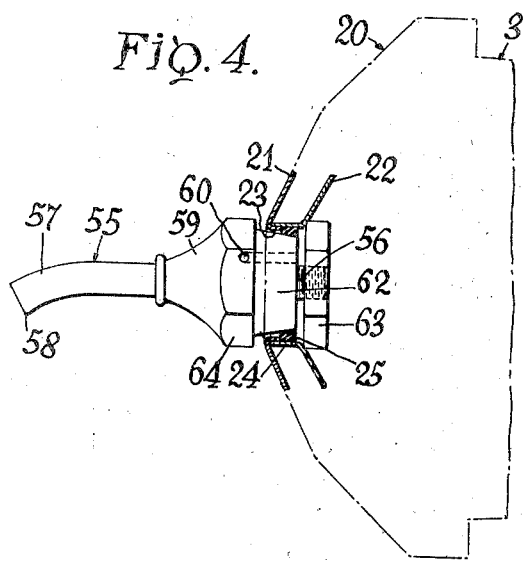
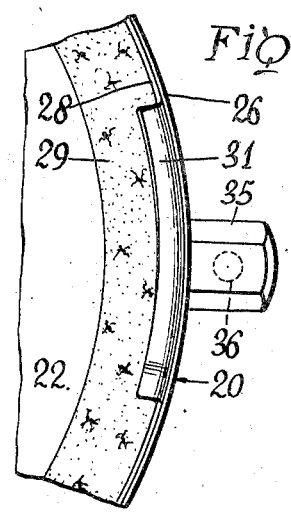
INVENTOR.
Joseph N. Amigone,
BY
Beau, Brooks, Buckley & Beau
ATTORNEYS.

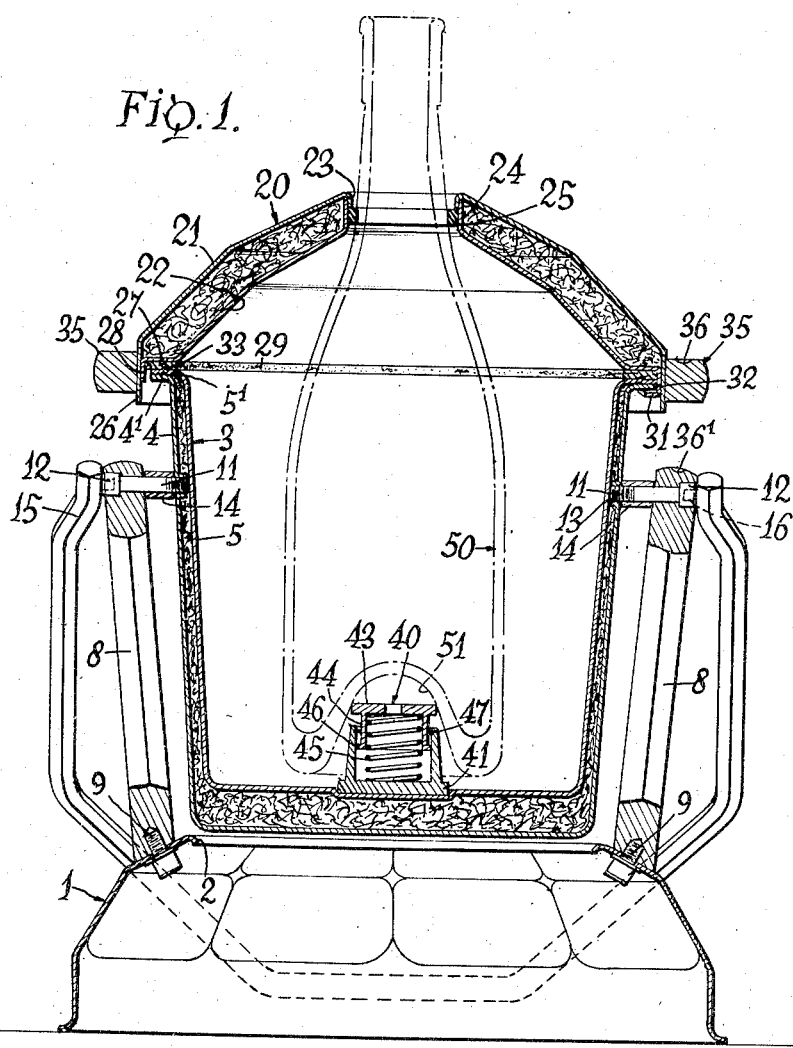

United States Patent Office 2,817,459
Patented Dec. 24, 1957

2,817,459

WINE BOTTLE COOLER, ICE BUCKET, AND BEVERAGE DISPENSER, AND HOLDER THEREFOR

Joseph N. Amigone, Buffalo, N. Y.

Application August 15, 1955, Serial No. 528,336

9 Claims. (Cl. 222—131)

This invention relates to a new and useful article of manufacture comprising a combination wine bottle cooler, ice bucket and beverage dispenser unit, and this application is in part a continuation of my pending application Ser. No. 428,034, filed May 6, 1954.

It has been the custom to keep champagne and other wine bottles chilled during use by simply resting the same in an open bucket filled with ice, the bucket generally being supported on a stand positioned adjacent the table. This practice has little to commend itself insofar as appearance is concerned, and furthermore does not keep the contents of the bottle uniformly chilled because the bottle usually is rested on one side whereby it lies at an angle with only its ower side being properly chilled. The bottle must be rotated periodically in order to keep its entire contents chilled, and even then the chilling is not necessarily uniform.

The primary disadvantage of this practice lies in the fact that the bottle must be removed from the bucket in order to dispense the contents thereof, and each time the bottle is lifted from the bucket the ice water drips therefrom and causes an annoying mess unless the bottle is carefully wiped off or a cloth is held thereunder.

Accordingly, it is a primary object of this invention to provide a practical wine bottle cooler which is susceptible of a highly pleasing and decorative appearance, which holds the bottle in a manner such that its contents are properly chilled, which enables the contents of the bottle to be dispensed by merely tipping the cooler without removing the bottle therefrom, and which also is adapted for use as an ice bucket and/or as a beverage dispenser.

A combination wine bottle cooler, ice bucket and beverage dispenser unit according to my invention is characterized in one aspect thereof by the provision of a pivotally supported, bucket-type receptacle having a removable cover, both the bucket and the cover being of insulated, double wall construction, the cover having an opening therethrough surrounded by sealing means for receiving and bearing against the neck of a bottle, and a cap device adapted to completely close the opening.

A combination wine bottle cooler, ice bucket and beverage dispenser unit according to my invention is characterized in another aspect thereof by the provision of a receptacle supported for tilting movement about a generally horizontal axis and having a removable cover, the cover having an opening for receiving the neck of a bottle therethrough, and a cap device adapted to completely close the cover opening when the unit is used for example as an ice bucket, or when it is not in use, and adapted when the unit is used as a wine bottle cooler to seat on the inner bottom wall of the receptacle and project into the recess in the bottom of the bottle to assist the cover in holding the bottle against movement relative to the receptacle when the latter is tilted to dispense the contents of the former.

A unit in accord with my invention also is characterized in other aspects thereof by certain novel features of arrangement and construction as will more clearly appear hereinafter.

The foregoing and other objects and advantages of a wine bottle cooler, ice bucket and beverage dispenser unit according to my invention will become clearly apparent upon a perusal of the ensuing detailed description, taken together with the accompanying drawing forming a part thereof wherein:

Fig. 1 is a vertical sectional view through a presently preferred form of combination wine bottle cooler, ice bucket and beverage dispenser unit in accord with my invention, indicating the manner of use thereof as a wine bottle cooler being taken about on line I—I of Fig. 2;

Fig. 2 is a top plan view of the unit of Fig. 1, the cover being partly broken away to illustrate certain details;

Fig. 3 is a fragmentary view showing the cap device closing the opening through the cover;

Fig. 4 is a fragmentary side elevational view showing the beverage dispensing spout in operative position on the receptacle cover;

Fig. 5 is a fragmentary detail view of the underside of the cover rim; and

Fig. 6 is a fragmentary detail view showing a modified handle arrangement.

Referring now to the accompanying drawing, a preferred form of wine bottle cooler, ice bucket and beverage dispenser unit in accord with my invention includes a holder having an annular base portion 1 formed with a circular top opening 2 which is approximately equal in diameter to the bottom portion of the receptacle main body part generally designated 3.

The receptacle main body part 3 comprises a bucket type receptacle of double wall construction, and preferably of generally circular cross section, having an outer wall member 4 of brass or other suitable material which can be plated to provide a pleasing appearance, and an inner wall member 5 which preferably is of steel to avoid contaminating the contents of the receptacle. Wall member 5 is secured in spaced relation to wall member 4, except at the rim thereof, as by spot welding the overlapping rim forming flange parts 4' and 5' at the upper edges thereof, whereby the inner surface of wall member 4 can be lined with suitable insulating material, such as fiberglass, and wall member 5 can be inserted into wall member 4 and secured thereto to provide a watertight, insulated, double wall structure.

Obviously, other conventional joining techniques could be used in place of the welded connection illustrated herein.

In addition to the base portion 1, the receptacle holder includes a pair of trunnion support members 8 comprising upwardly diverging leg members detachably secured to the base portion 1 on opposite sides of the bucket 3 as by the threaded bolts 9 extending through the base portion 1 and into the leg members 8.

The leg members 8 are substantially horizontally apertured adjacent their upper ends to receive therethrough the trunnion devices 11. Each trunnion device includes an enlarged head portion 12 fitting in a correspondingly sized socket or recess formed in the leg member 8 adjacent its outer side, and a main shank portion extending transversely through the leg member 8 and terminating in an exteriorly threaded portion engaging in an interiorly threaded and inwardly extending socket 13 formed on the outer wall member 4. A tubular spacing sleeve 14 encircles each trunnion device 11 to properly space the bucket 3 between the legs 8.

In this manner, the bucket is mounted to pivot about the axis defined by the opposed trunnion devices 11, and a bail type handle 15 is pivotally connected to the holder by means of laterally inwardly projecting pins 16 carried by the handle adjacent the opposite ends thereof and projecting into recesses formed in the enlarged head portions 12 of the trunnion devices 11. In this way, the handle 15 is available for carrying the entire unit from place to place, and pivots out of the way when the unit is in use.

The bucket 3 is provided with a removable cover, generally designated 20, which also is of insulated, double wall construction having an outer wall member 21 which preferably is of the same material as wall member 4 and an inner wall member 22 which preferably is of the same material as wall member 5. Wall member 20 is formed centrally thereof with an opening defined by the downturned flange 23 of generally annular cross section, and wall member 22 also is provided with a substantially central opening defined by the upstanding generally annular flange 24 which overlaps flange 23 and is secured thereto, as by welding, whereby flanges 23 and 24 define an opening in the receptacle cover for receiving therethrough the neck of a wine bottle. A suitable sealing and cushioning means in the form of a resilient gasket 25 is carried by the flange 24 against the bottom edge of flange 22 to bear against the bottle neck in a manner to be more fully described hereinafter.

Adjacent the rim of cover 20 wall member 21 is formed to provide a generally annular skirt portion 26 and wall member 22 is formed to provide a substantially horizontal, annular shelf portion 27 terminating in a depending annular flange 28 adapted to bear against wall member 26 and secured thereto, as by welding, thereby providing a double wall construction which can contain fiberglass or other suitable insulation as described in connection with the bucket 3. Shelf portion 27 carries on its underside a suitable sealing means, such as a gasket 29, adapted to bear against the upper side of the flange 5' of the bucket 3 to provide a liquid tight seal therewith. Also, to ensure a tight seal between the cover 20 and the bucket 3, I prefer to form an upstanding ridge 33 on the flange 5', which ridge bites into the gasket 29.

The depending flange 28 of wall member 22 is formed to provide inwardly projecting, inclined flange parts 31 at spaced points therearound, which flange parts are adapted to fit between spaced extensions 32 of the flanges 4' and 5' and, upon rotating the cover, urge the same tightly against gasket member 29. Thus, when it is desired to secure cover 20 on bucket 3, the cover is slipped over the bucket with flange parts 31 fitting between the flange extensions 32, and the cover is then rotated on the bucket to bring flange parts 31 beneath the extensions 32 and thereby urge the bucket rim against gasket 29 to releasably lock the cover on the bucket. To remove the cover, the foregoing operation is reversed.

To facilitate handling of cover 20, I provide diametrically opposed, radially outwardly projecting lugs 35 on the skirt 26, whereby these lugs can be grasped for purposes of rotating cover 20, and the like. Also, it is preferred that lugs 35 overlie leg members 8 when cover 20 is in locked position on bucket 3 and because in some instances, as when an uneven number of interlocking flanges 31, 32 are used, the cover must be initially aligned in a particular manner with the bucket to provide that result, one lug 35 carries a marking such as a detent 36, which can be colored, and which corresponds to a similar marking such as detent 36', also colored, formed in the top of one of the leg members 8. The lugs 35 are so positioned that detent 36 on the cover is aligned with detent 36' on the holder when the cover is properly positioned on the bucket. To assemble the cover on the bucket, it is first loosely placed thereon with detents 36 and 36' aligned, and cover 20 then is rotated in a counterclockwise direction until flanges 31 slip between flanges 32, whereupon the cover is rotated in a clockwise direction to locked position.

When not being used as a wine bottle cooler or a beverage dispenser the cover opening defined by the flanges 23 and 24 can be closed by a plug-like cap device, generally designated 40, which bears against gasket 25 with a friction fit to provide a tight seal, as illustrated in Fig. 3.

It is a particular feature of my invention that novel means are provided to project into the recess normally found in the bottom of wine bottles and cooperate with the cover in holding the bottle properly positioned within the bucket when the bucket is pivoted to dispense the contents of the bottle. In accord with my invention, such means are removable, leaving the bucket with a substantially flat and uninterrupted inner bottom wall, and comprise the aforesaid cap device. It is a particular feature of a presently preferred form of my invention that the cap device has a spring-backed plunger part urging the bottle tightly against the cover gasket 25.

Thus, as illustrated in Figs. 1 and 3 of the accompanying drawing, cap device 40 is of generally circular cross section throughout and comprises an enlarged head portion 41 at one end of a tapered shank portion 42, which latter is hollow and provide a generally cylindrical socket. A plunger part having an enlarged head portion 43 and a shank portion 44 is carried by the cap device with the shank portion 44 extending into the shank portion 42 for lengthwise sliding movement therein, whereby the cap device comprises telescopically related parts. A spring 45 extends between and bears against the inner surfaces of the head portions 41 and 43 and urges the plunger part outwardly, the outward movement of the plunger part being limited by the flange 46 bearing against the split ring washer 47 secured in a groove around the inside of shank portion 42 adjacent its open end.

Therefore, when the unit is not in use, or when it is being used as an ice bucket, the cap device 40 is used to close the cover opening, the tapered shank portion 42 bearing tightly against the gasket 25.

When it is desired to use the unit as a wine bottle cooler, cover 20 is removed and cap device 40 is removed from the cover opening and inverted, and its shoulder-defining head portion 41 engages a shoulder-defining seat in the form of a shallow recess 48 formed in the inner bottom wall surface of the bucket wall member 5. The wine bottle, indicated schematically at 50, then is placed over the cap device which projects into the recess 51 normally found in the bottom of the bottle. The cover 20 then is slipped over the neck of the bottle, and locked in position in the manner previously described, whereby the spring backed plunger head portion 43 of the cap device plunger part engages the wall of the bottle recess and urge the bottle tightly against the gasket 25 in the cover 20.

The cap device 40 carried in the bucket recess 48 and projecting into the bottle recess and urging the bottle tightly against the cover opening gasket, cooperates with the cover 20 to hold the bottle properly positioned in the bucket, as illustrated in Fig. 1, even when the bucket is tipped to pour the contents from the bottle. It will be noted that the spring-backed plunger part of the cap device does two things. It urges the bottle tightly against the cover gasket 25 to provide a tight seal therebetween, and it accommodates variations in bottle height and neck size and shape.

The advantages of this construction are obvious. The bottle need not be removed from the bucket when it is desired to serve the wine, and instead the bucket is tilted about its pivot axis. The cap device 40 and the cover 20 hold the bottle fixed in position even when the bucket is tilted, and because the center of gravity of the bucket and the bottle is below the pivot axis, the bucket will return to its upright normal position whereby the contents of the bottle are uniformly chilled throughout.

The bucket can be supported on a stand placed beside the table, or on a holder adapted to be placed on the table as illustrated herein.

Also, it will be noted that with this arrangement the cap device is not placed to one side, where it can be lost, when the unit is used as a wine bottle cooler, but instead interfits with the bottom wall of the container main body portion and cooperates with the cover part to secure the bottle in position. It will be appreciated that additional shoulder forming anchoring parts, such as one or more bosses on the cap device, and/or other recess in the bucket bottom wall for receiving such bosses or the bottom of the bottle, as disclosed for example in my earlier case, can be provided.

As previously noted, when the unit is used as an ice bucket the cap device 40 is fitted in place in the cover opening and, because of the insulated double wall construction, together with the liquid tight seal between the cover and the bucket, and between the cover and the cap device, there is provided an ice bucket which will hold a substantial quantity of ice against melting for a substantial period of time and without danger of accidental spilling, the cover being readily removed and replaced, as previously described to permit removal of ice cubes from the bucket.

When the unit is used as a beverage dispenser, the cap device 40 is replaced by a beverage dispensing spout member generally designated 55. Whereas in my earlier application I disclosed a dispensing spout in the form of a spigot adapted to be secured in a conduit extending through the bucket wall members adjacent the bottom thereof, in the presently preferred form of my invention I prefer to use a spout member of the type shown which is secured in an opening through the cover 20 for dispensing beverages from the receptacle in much the same manner as wine is dispensed from a bottle carried by the receptacle.

The spout member 55 comprises an elongated conduit extending completely therethrough for the passage of liquid from the container and having at its inner end an anchoring part in the form of an exteriorly threaded post 56, its outer end being formed to provide a spout portion 57 having a lip 58 for greater convenience in pouring. The liquid dispensing conduit is carried within a plug-like main body part 59 of pleasing design having a vent passage 60 therethrough separate from the liquid dispensing conduit.

In accord with my invention, when it is desired to use the unit as a beverage dispenser the cover 20 is removed and the bucket is filled with the beverage which can be either hot or cold. Spout member 55 then is secured to the cover with the tapered shank 62 of the main body part 59 fitting into the cover opening and bearing tightly against the gasket 25. The spout member is releasably secured in position by a locking member in the form of a nut 63 which threadedly engages the post 56 and bears against the inner wall member 22. Then, whenever it is desired to dispense the beverage within the container, the container is tipped about its pivot axis, and it will be appreciated that the curved end of the spout portion 57, leading to the lip 58, preferably will extend at right angles to the bucket pivot axis. Also, the main body portion which remains outside of the cover can be of flat sided form, as shown at 64, to facilitate grasping and turning the main body part to remove it from the cover.

If desired, the handle 15 can have alternative points of connection to the bucket holder, as disclosed in my earlier application. Thus, looking now at Fig. 6, the trunnion supports can comprise leg members 8' secured to the holder base portion in the same manner as leg members 8 but formed at their upper ends with inwardly extending bearing portions 70 carrying trunnion pivot devices 11' in threaded engagement therewith, the pivot devices engaging sockets 13' formed in the outer wall member 4 to provide a pivot for the bucket, in the manner previously described. Bearing portions 70 are bored to receive pins 16' which project outwardly therefrom for selective engagement in one of the openings 71 spaced along each handle leg portion. Thus, when the unit is being used, for example, as an ice bucket the pivot pins 16' can engage the openings 71 closest to the bight portion of the handle 15', whereby the handle will just clear the cover for maximum compactness. However, when the unit is being used as a win bottle cooler, or as a beverage dispenser, the increased height caused by the exposed portion of the bottle or of the dispensing spout member can be accommodated by spreading apart the leg portions of handle 15', to release them from the pivot pins 16', and placing the pins 16' in the openings 71 closest to the outer ends of the handle leg portions.

Thus, it will be seen that my invention fully accomplishes the aforesaid objects, and provides an extremely practical combination wine bottle cooler, beverage dispenser and ice bucket which is susceptible of a highly pleasing appearance. While only a single preferred embodiment and one variation of a part thereof have been illustrated herein, I do not intend to be limited to the details thereof which are susceptible of variation and modification without departing from my invention, and instead I intend that my invention be defined by the appended claims.

Having fully disclosed and completely described my invention, together with its mode of operation, what I claim as new is:

1. A wine bottle cooler comprising, a holder including a base portion, a bucket type receptacle, means mounting said receptacle on said base portion for tilting movement about a generally horizontal axis, a removable cover member for said receptacle, means defining an opening through said cover member for receiving the neck of a wine bottle in said receptacle, gasket means carried by said cover member around said opening for bearing against the bottle neck, a plug-like cap device having a head portion and a tapered shank portion fitting in said opening for closing the same, means defining a seat on the inner bottom wall of said receptacle for receiving the head portion of said cap device when the same is removed from said opening and placed in inverted position on said seat and holding said cap device in inverted position in substantial alignment with said opening and against sliding movement across said inner bottom wall, said cap device when so positioned projecting into the recessed bottom wall of a wine bottle and cooperating with said cover member in holding the wine bottle against movement relative to said receptacle when the latter is tilted to dispense the contents of the former, said cap device including a plunger part having a shank part arranged in telescopic relation to said shank portion and a head part spring-biased to project beyond said shank portion to engage the bottom wall of the bottle and resiliently urge the neck of the bottle against said sealing means.

2. In a combination wine bottle cooler, beverage dispenser and ice bucket, a holder, a bucket like receptacle, means mounting said receptacle on said holder for tilting movement about a generally horizontal axis, a cover member for said receptacle, said receptacle and said cover member each having an inner wall member and an outer wall member forming a double wall insulated construction, the inner and outer wall members of said receptacle terminating in overlapping lateral flange portions defining a generally annular rim therearound, the outer wall member of said cover member terminating in a generally annular skirt extending below said rim when said cover is positioned on said receptacle, the inner wall member of said cover member having a generally annular shelf portion substantially coincident with said rim, gasket means carried by one of said rim and said shelf portion for bearing against the other thereof, multiple outwardly extending first flange parts spaced around said rim, and multiple inwardly extending second flange parts carried by said cover member within said skirt and adapted to fit between said first flange parts and then, upon rotating said cover member relative to said receptacle, engage therebeneath to clamp said cover member in position on said receptacle.

3. The construction set forth in claim 2, together with a pair of diametrically opposed lugs projecting generally radially outwardly from said skirt for being grasped when rotating said cover member.

4. The construction set forth in claim 3, wherein said holder includes a pair of generally upright support members on which said receptacle is pivotally mounted, said lugs being aligned with said support members when said cover member is secured in position on said receptacle, and positioning indicia on at least one of said lugs and its corresponding support member to facilitate the positional alignment of said cover member on said receptacle.

5. In a combination wine bottle cooler, beverage dispenser and ice bucket, a holder, a bucket-like receptacle, means mounting said receptacle on said holder for tilting movement about a generally horizontal axis, a cover member for said receptacle, said receptacle and said cover member each having an inner wall member and an outer wall member forming a double wall construction, the inner and outer wall members of said receptacle terminating in overlapping lateral flange portions defining a generally annular rim therearound, the outer wall member of said cover member terminating in a generally annular depending skirt portion extending below said rim when said cover is positioned on said receptacle, the inner wall member of said cover member having a generally annular shelf portion substantially coincident with said rim and leading to a depending flange bearing against said skirt portion, gasket means carried by one of said shelf portion and said rim for bearing against the other thereof, and multiple outwardly projecting first flange parts spaced around said rim, said depending flange terminating in multiple spaced apart and inwardly projecting second flange parts fitting between said first flange parts when said cover member is placed on said receptacle, said second flange parts inclining around said cover member and adapted, upon rotating said cover member relative to said receptacle, to extend beneath said first flange parts and clamp said cover member to said receptacle.

6. A beverage dispenser comprising, a holder having a base portion, a receptacle pivotally supported by said holder for tilting movement about a generally horizontal axis, a removable cover member for said receptacle, means for releasably securing said cover member on said receptacle, first sealing means between said receptacle and said cover member, means defining an opening through said cover member, second sealing means carried by said cover member around said opening, and a dispensing spout member having a tapered body portion fitting in said opening and adapted to bear against said second gasket means, a liquid dispensing passage through said body portion for dispensing liquid from said receptacle when the same is tilted about said axis, a vent passage through said body portion, and means releasably securing said spout member to said cover member.

7. In a combination wine bottle cooler, ice bucket and beverage dispenser, a holder, a bucket type receptacle, means mounting said receptacle on said holder for tilting movement about a generally horizontal axis, a removable cover member for said receptacle, means for releasably securing said cover member on said receptacle, first sealing means between said cover and said receptacle, means defining an opening through said cover member, second sealing means carried by said cover member around said opening, and a dispensing spout member having a plug-like tapered main body portion fitting said opening and adapted to bear against said second sealing means, a spout portion on the outer end of said main body portion and a threaded anchoring post at the inner end thereof, means providing a beverage dispensing passage through said anchoring post, said main body portion and said spout portion, means providing a vent passage through said main body portion, and a locking member threadedly engaging said anchoring post and bearing against the inner wall surface of said cover member to releasably secure said spout member thereto.

8. In a wine bottle cooler, a holder including a base portion and a pair of support members extending upwardly therefrom, a bucket type receptacle, means pivotally mounting said receptacle on said support members, a removable cover member for said receptacle, means defining a generally central opening through said cover member for receiving the neck of a wine bottle, sealing gasket means carried by said cover member around said opening for bearing against the bottle neck, a cap device in the form of a plug having a head portion and a tapered shank for fitting in said opening to close the same, and cooperating means on said cap device head portion and on the inner bottom wall of said receptacle for holding said cap device in inverted position on said inner bottom wall against sliding movement thereacross and in substantial alignment with said cover member opening when said cap device is removed therefrom and placed in inverted position with said cap device head portion means in cooperating association with said inner bottom wall means, said cap device when so positioned projecting into the recessed bottom wall of a wine bottle in said receptacle to urge the neck thereof against said gasket means and cooperating with said cover member to hold such bottle against movement relative to said receptacle as the latter is tilted to dispense the contents of the former, wherein said cap device includes a plunger part spring-biased to project from the end of said shank, said spring-biased plunger part engaging the bottom wall of a wine bottle to resiliently urge the neck thereof against said gasket means.

9. In a combination wine bottle cooler, beverage dispenser and ice bucket, a holder including a pair of generally upright support members, a bucket-like receptacle pivotally mounted on said support members for tilting movement about a generally horizontal axis, a cover member for said receptacle, said receptacle being open at the top thereof and having a generally annular rim therearound, said cover member having a generally annular skirt extending below said rim when said cover is positioned on said receptacle, means for releasably securing said cover member to said receptable upon placing said cover member thereon and rotating the same relative thereto, a pair of diametrically opposed lugs projecting generally radially outwardly from said cover member skirt for being grasped when rotating said cover member, said lugs being substantially aligned with said support members when said cover member is secured in position on said receptacle.

References Cited in the file of this patent
UNITED STATES PATENTS

| 81,814 | Nuellens et al. | Sept. 1, 1868 |
| 291,857 | Welling | Jan. 8, 1884 |
| 322,081 | Valentine | July 14, 1885 |
| 488,473 | Fruen | Dec. 20, 1892 |

FOREIGN PATENTS

| 1,775 | Great Britain | May 29, 1868 |